US 7,876,937 B2

(12) United States Patent
Schildkraut et al.

(10) Patent No.: US 7,876,937 B2
(45) Date of Patent: Jan. 25, 2011

(54) LOCALIZATION OF NODULES IN A RADIOGRAPHIC IMAGE

(75) Inventors: Jay S. Schildkraut, Rochester, NY (US); Shoupu Chen, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 976 days.

(21) Appl. No.: 11/532,246

(22) Filed: Sep. 15, 2006

(65) Prior Publication Data
US 2008/0069415 A1 Mar. 20, 2008

(51) Int. Cl.
*G06K 9/00* (2006.01)
(52) U.S. Cl. .................. 382/128; 382/100; 382/168; 382/173; 600/407
(58) Field of Classification Search .......... 382/100, 382/103, 128, 130–134, 168, 170–172, 173, 382/254, 270–273; 345/581, 589; 600/425, 600/426; 378/65
See application file for complete search history.

(56) References Cited

U.S. PATENT DOCUMENTS

| | | | | |
|---|---|---|---|---|
| 5,825,922 A | * | 10/1998 | Pearson et al. | 382/199 |
| 5,951,475 A | * | 9/1999 | Gueziec et al. | 600/425 |
| 5,987,094 A | * | 11/1999 | Clarke et al. | 378/62 |
| 6,078,680 A | * | 6/2000 | Yoshida et al. | 382/128 |
| 2003/0035507 A1 | * | 2/2003 | Hsu et al. | 378/4 |
| 2003/0052875 A1 | * | 3/2003 | Salomie | 345/419 |
| 2003/0107770 A1 | * | 6/2003 | Klatchko et al. | 358/3.21 |
| 2005/0197567 A1 | * | 9/2005 | Qian et al. | 600/425 |
| 2005/0207630 A1 | * | 9/2005 | Chan et al. | 382/131 |
| 2006/0093197 A1 | * | 5/2006 | Unal et al. | 382/128 |
| 2006/0177125 A1 | * | 8/2006 | Chan et al. | 382/154 |

OTHER PUBLICATIONS

Jay S. Schildkraut et al., "Level Set Segmentation of a Pulmonary Nodule in a Radiograph Using a Prior CT Scan," 2006 Western New York Image Processing Workshop, Sep. 29, 2006, pp. 31-33, XP002463477.
D. E. Maroulis et al., "Computer-Aided Thyroid Nodule Detection in Ultrasound Images," Computer-Based Medical Systems, 2005 Proceedings, $18^{th}$ IEEE Symposium , Jun. 23, 2005, pp. 271-276, XP010818007.
Jundong Liu, "Robust Image Segmentation using Local Median," Computer and Robot Vision, 2006, the $3^{rd}$ Canadian Conference, Jun. 7-9, 2006, pp. 31-37, XP010919342.
N. Passat et al., "Magnetic Resonance Angiography: From Anatomical Knowledge Modeling to Vessel Segmentation," Medical Image Analysis, Oxford University Press, vol. 10, No. 2, Apr. 2006, pp. 259-274, XP005276426.

(Continued)

*Primary Examiner*—Sath V Perungavoor
*Assistant Examiner*—Jason Heidemann

(57) ABSTRACT

A method for determining a location of an object in a radiographic image by segmentation of a region in the image comprises the steps of: determining a first image intensity that is characteristic of high image intensities in the region; determining a second image intensity that is characteristic of low image intensities outside of the region; and determining if a pixel is added to or removed from the region based on the similarity of the pixel's intensity to the first and second intensity.

9 Claims, 5 Drawing Sheets

OTHER PUBLICATIONS

G. W. Sherouse et al.; "Computation of digitally reconstructed radiographs for use in radiotherapy treatment design" J. Radiation Oncology Biol. Phys., vol. 18, pp. 651-658, 1990.

J. A. Sethian; Level Set Methods and Fast Marching Methods, 2nd Ed., Cambridge University Press, Cambridge, 1999.

T. F. Chen et al.; "Active contours without edges" IEEE Transactions on Imaging Processing vol. 10, No. 2, pp. 266-277, 2001.

G. Arfken; Mathematical Methods for Physicists; 3rd Ed., Academic Press, Inc., Orlando, pp. 942-943, 1985.

L. A. Vese et al.; "A multiphase level set framework for image segmentation using the Mumford and Shah model" International Journal of Computer Vision 50(3), pp. 271-293, 2002.

D. Cremers et al.; "A Pseudo-distance for Shape Priors in Level Set Segmentation" 2nd IEEE Workshop on Variational, Geometric, and Level Set Methods in Computer Vision, Nice, 2003.

M. Sussman et al.; "A Level Set Method for Computing Solutions to Incompressible Two-Phase Flow", Journal of Computational Physics 114, pp. 146-159, 1994.

* cited by examiner

LOCALIZATION OF NODULES IN A RADIOGRAPHIC IMAGE

CROSS REFERENCE TO RELATED APPLICATIONS

Reference is made to commonly-assigned copending U.S. patent application Ser. No. 11/039,422, filed Jan. 20, 2005, entitled RADIATION THERAPY METHOD WITH TARGET DETECTION, by Schildkraut et al.; U.S. patent application Ser. No. 11/221,133, filed Sep. 7, 2005, entitled ADAPTIVE RADIATION THERAPY METHOD WITH TARGET DETECTION, by Schildkraut et al.; U.S. patent application Ser. No. 11/187,676, entitled PULMONARY NODULE DETECTION IN A CHEST RADIOGRAPH, filed Jul. 22, 2005 by Schildkraut et al.; and U.S. patent application Ser. No. 11/419,848 entitled SYSTEM FOR THE REAL-TIME DETECTION OF TARGETS FOR RADIATION, filed May 23, 2006, by Schildkraut et al; the disclosures of which are incorporated herein.

FIELD OF THE INVENTION

The invention relates generally to the segmentation of an object in a radiographic image, and in particular, to the detection of a target at the time of radiation treatment without the use of internal markers.

BACKGROUND OF THE INVENTION

This invention is for the radiation treatment of targets that move due to a physiological process. Especially the treatment of pulmonary nodules that move due to respiration. The treatment margin that is required because of uncertainty of nodule location can be reduced to about 3 mm if treatment planning image capture and radiation treatment both occur when the patient is in a relaxed exhalation respiratory state. An object of the present invention is to further reduce the margin to about 1 mm by using a radiographic imaging system to capture images of the nodule immediately before and/or during radiotherapy.

For this purpose, the present invention provides improvements to an existing image segmentation method so that this method can be used for the special case of localizing a nodule in a radiograph. Based on the location of the nodule in the radiograph treatment may be modified by withholding irradiation, moving the patient, or moving the therapeutic beam to better target the nodule.

The present invention is described in the context of localizing a nodule in a single radiographic image. However, it should be understood that this invention includes localizing a nodule in more than one radiograph at approximately the same time in order to determine the location of the nodule in three-dimensional space. In this invention, a nodule is a mass of any shape and size. The nodule may benign or malignant.

Automatic determination of the location of an nodule in a radiograph can enable radiography to be used for near real-time nodule localization during medical procedures. Unfortunately, the localization of a nodule in a radiograph is generally very difficult because a radiographic image is a superposition of the radiodensity of all tissue in the path of the X-ray beam. Overlapping and surrounding structures often confound segmentation methods that determine the region in the radiograph that is occupied by the nodule.

The ability of a segmentation method to localize a nodule is greatly enhanced by the use of information that is obtained from the planning image on the characteristics of the nodule as disclosed in commonly-assigned U.S. patent application Ser. Nos. 11/039,422 and 11/221,133. However, the planning image is often a tomographic image that is captured at a lower resolution than is typical of a radiographic image. It is a goal of this invention to provide an image processing means to localize a nodule in a radiograph with a higher degree of accuracy than is possible by existing image segmentation methods including those that use prior information.

SUMMARY OF THE INVENTION

Briefly, according to one aspect of the present invention a method for determining a location of an object in a radiographic image by segmentation of a region in the image comprises the steps of: determining a first image intensity that is characteristic of high image intensities in the region; determining a second image intensity that is characteristic of low image intensities outside of the region; and determining if a pixel is added to or removed from the region based on the similarity of the pixel's intensity to the first and second intensity.

This invention provides an improvement over image segmentation methods that use the Mumford-Shah "energy" to drive the segmentation process that identifies a region in the image with uniform intensity. This energy is not suitable for the segmentation of a nodule in a radiograph because overlapping tissue often causes the nodule region to be highly non-uniform in intensity. In this invention, the Mumford-Shah energy is replaced by a contrast energy that is designed to segment a nodule in a radiograph based on the fact that nodules locally increase the intensity in a radiograph.

This invention also adds to the segmentation process an energy that is based on image intensity gradient direction convergence to accurately determine the contour of a nodule in a radiographic image. Although the convergence of the direction of intensity gradient has been used in the past to detect the presence of a nodule in a radiograph, in this invention it is demonstrated how an intensity gradient direction convergence energy can be incorporated into a segmentation method for the purpose of accurately localizing a nodule in a radiograph.

DETAILED DESCRIPTION OF THE INVENTION

In one embodiment of the invention the contour of a region in an image is represented as a level set. This means that a real-valued function is defined at every pixel in the image. The pixels at which this "level set function" equal zero define the region contour. A level set function is used to represent the contour of a region in a radiograph. At the end of a successful segmentation process this region localizes the nodule. A level set function is also used to represent the contour of a nodule in a prior image. In this invention, the prior image is a digitally reconstructed radiograph (DRR) that contains the nodule that is calculated from a CT scan of the patient. The goal of the segmentation method is to evolve this level set function using an energy minimization process until it defines a contour that precisely corresponds with the actual contour of the nodule.

Figure 1:
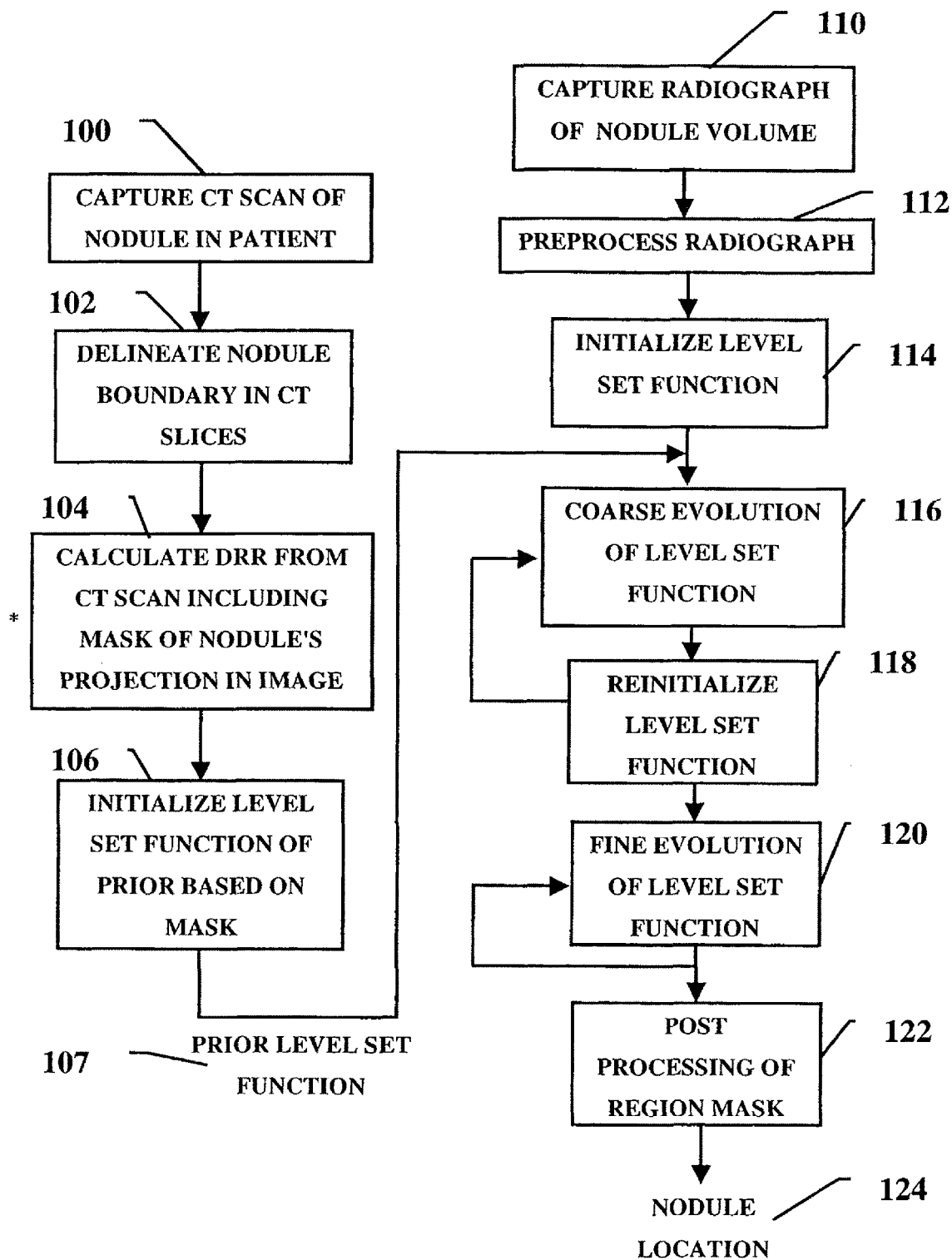
FIG. 1 is an overview of the method of nodule segmentation.

The method of nodule segmentation is outlined in FIG. 1. Steps 100 through 106, on the left side of the figure, occur in the planning phase. In step 100 a CT scan of the patient is captured that includes the nodule. In step 102 the boundary of the nodule is delineated in each CT slice in which it appears. Next, in step 104 a digitally reconstructed radiograph (DRR) is computed from the CT scan. The location of the simulated source and detector used in this calculation matches the geometry of the radiographic system that is used at the time of treatment. In the calculation of the DRR a record is maintained of the rays that pass through the nodule. This information is then used to produce a mask of the projection of the nodule in the DRR. Finally, in step 106 a level set function is calculated for the nodule's projection in the DRR that is a signed distance function from the boundary of the mask. This level set function is used as the prior level set function in subsequent steps.

The steps of the treatment phase are shown on the right side of FIG. 1. In step 110 a radiograph is captured of the region around the nodule. The radiograph is preprocessed in step 112 in order to facilitate the nodule segmentation process. In step 114 a contour in the radiograph is initialized to a circle around the area in the radiograph that may contain the nodule and a level set function for this contour is initialized to a signed distance function.

The purpose of the next series of steps 116 through 120 is to evolve this level set function for the contour in the radiograph so that the contour (points at which the level set function equals zero) evolves to the actual contour of the nodule. This is accomplished by defining several energy terms that depend on the level set function and iteratively minimizing the total energy by using equations obtained through the calculus of variations. As indicated in FIG. 1, the level set function of the nodule in the DRR 107 that is calculated from the CT scan of the patient is used in this process.

The evolution of the level set function for the radiograph is divided into a coarse and fine stage. In the coarse stage, step 116 in FIG. 1, energy terms are minimized that are useful even when the current region contour is far from the contour of the nodule. The most important energy term that is used in this step is the contrast energy which is part of this invention.

The coarse segmentation step 116 may optionally be followed by step 118 in which the level set function is reinitialized to a signed distance function. In a level set segmentation process the segmented region often consists of two or more disconnected regions. In an embodiment of this invention, this reinitialization step includes modifying the current segmented region so that it contains a single connected region. The level set function is then reinitialized for the modified region to a signed distance function. This reinitialization step may also be inserted after any or all of the coarse and fine level set evolution iterations.

In the fine level set evolution step 120 energy terms are minimized that are of value when the current region contour is close to the actual contour of the nodule. This fine stage provides an accurate contour for the nodule that precisely determines its position in the image. The intensity gradient direction convergence energy that is part of this invention is the most important part of step 120.

The fine level set function evolution step 120 results in a preliminary mask of the nodule region. This mask is processed further in step 122 in order to obtain a final mask of the region in the radiograph (item 124 in FIG. 1) that identifies the location of the nodule.

DRR Calculation

The method used to calculated DRRs in step 104 in FIG. 1 is as described by G. W. Sherouse, K. Novins, and E. L. Chaney, in "Computation of digitally reconstructed radiographs for use in radiotherapy treatment design," *J. Radiat. Oncol. Biol. Phys.* 18, pp. 651-658 (1990). Rays are traced from a simulated source point to each pixel in a simulated detector through the CT data. The CT value at a ray point is obtained by trilinear interpolation of the CT values at the eight corner points of the voxel that contains the point. In the DRR generation process a record is made of rays that pass through the nodule and the amount of density the nodule contributes to the integral density along each ray. The pixels in the DRR that are associated with rays that pass through the nodule define the region of the nodule's projection in the DRR image.

Preprocessing of Radiograph

In step 112 in FIG. 1 the radiograph is processed in order to remove low frequency intensity gradients and place the image into a standard form. The removal of low frequency intensity gradients in this step increases the effectiveness of the intensity gradient direction convergence energy that is used in step 120. Low frequency intensity gradients are removed by fitting the image intensities to a third-order bivariate polynomial. This polynomial is then subtracted from the image. The resultant image is then scaled so that the mean intensity code value and code value standard deviation are set to standard values. The standard mean code value and code value deviation are 2000 and 600, respectively.

Level-Set Segmentation Theory—Minimization of Energy Integral with Levels Sets

In the image domain $\Omega$ the contour of the segmented region R is represented by a level set function $\phi(x, y)$ using the convention that $\phi(x, y) > 0$ inside the region. Two methods are commonly used to evolve the level set function from its initial state to a function with zero level set with $\phi(x, y) = 0$ at the true object contour. Sethian uses an equation of motion that drives movement of the contour at a velocity that approaches zero as the true contour is reached. [J. A. Sethian, *Level Set Methods and Fast Marching Methods*, $2^{nd}$ ed. (Cambridge University Press, Cambridge, 1999).] Alternatively, Chan and Vese define an energy in terms of the level set function that is minimized when the zero level set is at the true contour. [T. F. Chen and L. A. Vese, "Active contours without edges," *IEEE Transactions on Imaging Processing* 10, pp. 266-277 (2001).]

In the preferred embodiment of this invention the energy minimization approach to level set segmentation is used. An energy is defined that is dependent on the region R, the image intensity data I(x, y), and the region in a prior image. Since the contour of the segmented region is represented as a level set function, the segmentation process requires finding the level set function that minimizes this energy.

With the exception of energy term that depends on the prior region, the energy terms have the form, $$E = \int_\Omega \int f(\phi, \phi_x, \phi_y, x, y) dx dy. \tag{1}$$

This integral is minimized with respect to φ(x, y) using the calculus of variations for the case of several independent variables. [Arfken, *Mathematical Methods For Physicists*, 3$^{rd}$ ed. (Academic Press, Inc., Orlando, 1985), pp. 942-943.] Equation (1) leads to the following partial differential equation (PDE) for the evolution of the level set function, $$\frac{\partial \phi(x, y)}{\partial t} = -\left(\frac{\partial f}{\partial \phi} - \frac{\partial}{\partial x}\frac{\partial f}{\partial \phi_x} - \frac{\partial}{\partial y}\frac{\partial f}{\partial \phi_y}\right). \quad (2)$$

Contrast Energy

Segmentation methods often use the Mumford-Shah energy which is minimized when the image inside and outside a region R are homogeneous. [L. A. Vese and T. F. Chan, "A multiphase level set framework for image segmentation using the Mumford and Shah model," *International Journal of Computer Vision* 50(3), pp. 271-293, (2002).] The integrand for this energy is, $$f(x, y) = |I(x, y) - I_{in}^{avg}|^2 H(\phi(x, y)) + |I(x, y) - I_{out}^{avg}|^2 (1 - H(\phi(x, y))) \quad (3)$$

where $I_{in}^{avg}$ is the average image intensity within R, $I_{out}^{avg}$ is the average intensity outside the region, and H(z) is the Heaviside function. Inserting Equation (3) into Equation (2) results in the evolution equation for the Mumford-Shah energy, $$\frac{\partial \phi(x, y)}{\partial t} = -|I(x, y) - I_{in}^{avg}|^2 \delta(\phi(x, y)) + |I(x, y) - I_{out}^{avg}|^2 \delta(\phi(x, y)) \quad (4)$$

where δ(z) is the delta function.

The Mumford-Shah energy is very useful for the segmentation of objects in a photographic image. However, it is not suitable for the segmentation of a nodule in a radiograph because the image intensity in the nodule region is usually not homogenous due to overlapping tissue. In addition, a region-based energy that is designed to segment a nodule in a radiograph should take into account that nodules locally increase the image intensity.

Figure 2:
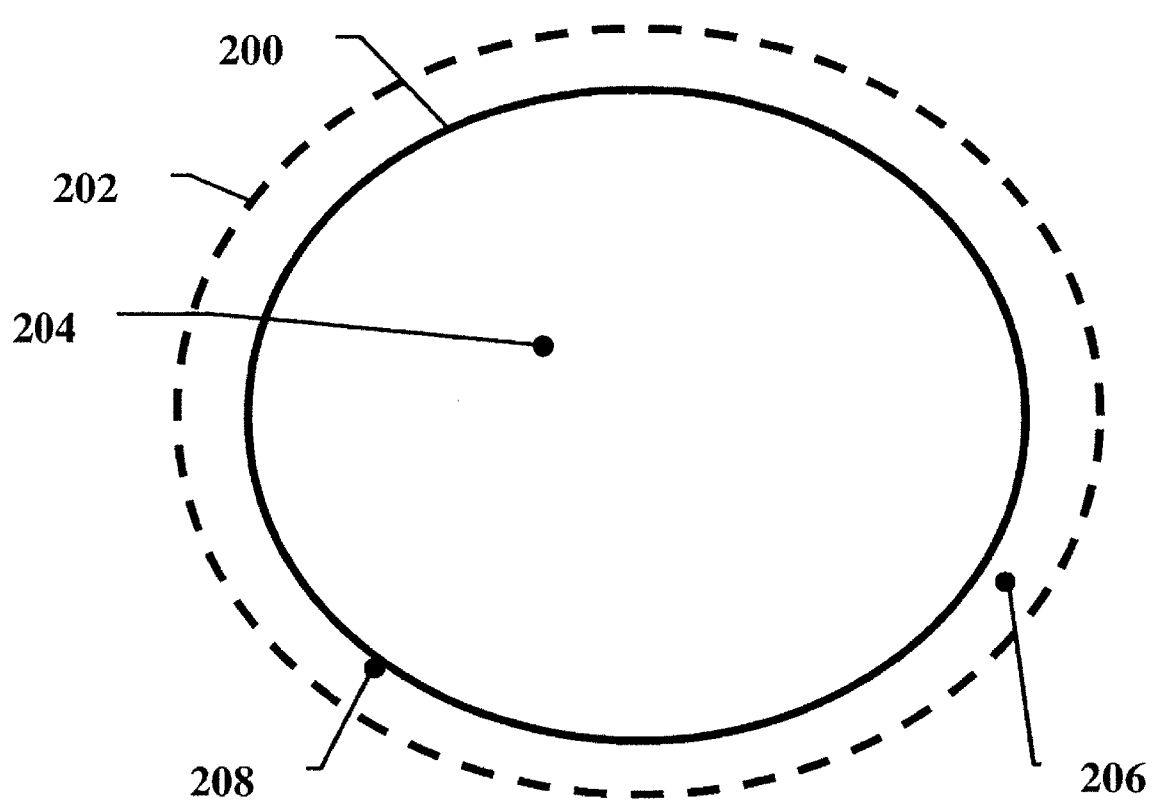
FIG. 2 is an illustration of the contrast energy.

In place of the Mumford-Shah energy, this invention provides a region-based energy, which is called the contrast energy, that is specially designed for the segmentation of a nodule in a radiograph. This contrast energy is described with reference to FIG. 2. At an iteration in the segmentation process the current segmented region R has contour 200. The surrounding region is the area of the image that is in between contours 200 and 202. In order to calculate the contrast energy the point 204 in the region R with the maximum intensity is determined and the point 206 in the surrounding region with the lowest intensity is determined. FIG. 2 shows a point 208 that is near the region contour 200. The contrast energy is designed to modify the contour 200 to either include or exclude point 208 from region R based on the relationship of the intensity at this point to the intensity at points 204 and 206.

One embodiment of the contrast energy has the integrand, $$f(x, y) = |I(x, y) - I_{in}^{max}|^2 H(\phi(x, y)) + |I(x, y) - I_{out}^{min}|^2 (1 - H(\phi(x, y))) \quad (5)$$

where $I_{in}^{max}$ is the maximum image intensity within R and $I_{out}^{min}$ is the minimum intensity outside the region. Inserting Equation (5) into Equation (2) results in the evolution equation for the contrast energy, $$\frac{\partial \phi(x, y)}{\partial t} = -|I(x, y) - I_{in}^{max}|^2 \delta(\phi(x, y)) + |I(x, y) - I_{out}^{min}|^2 \delta(\phi(x, y)) \quad (6)$$

where δ(z) is the delta function.

Inspection of Equation (6) shows that at a pixel (x, y) in the image the value of the level set function is increased if the intensity at this point is closer to the maximum region intensity than the minimum surround intensity. Increasing the value of the level set function tends to include this point in the region R. Conversely, if the intensity at this point is closer to the minimum surround intensity than the maximum region intensity the level set function is decreased at this point. This has the affect of tending to exclude the point from the region.

The energy integrand in Equation (5) is only one of many possible expressions of the contrast energy. For example, instead of the square of intensity difference the absolute value of intensity difference can be used. Also, the maximum intensity in the region $I_{in}^{max}$ can be replaced by other measures of the high intensities in the region. For example, $I_{in}^{max}$ can be replaced by the intensity at a specified penetration into the top of the histogram of region intensities. Similarly, $I_{out}^{min}$ can be replaced by the intensity at a specified penetration into the bottom of the histogram of surrounding region intensities.

Gradient Direction Convergence Energy

As already discussed, nodules in a radiograph are often obscured by overlapping tissue. The image intensity within the nodule region is often highly variable. For example, when a structure such as a rib partially overlaps with a nodule the image intensity within the region of overlap is much greater than outside. Researchers in the field of computer aided detection of pulmonary nodules have developed features for nodule detection that minimize the affect of overlapping tissue. One of the most robust features for nodule detection is to measure the convergence of intensity gradient direction to a central region. See U.S. Pat. No. 5,987,094 (Clarke et al.)

Figure 3:
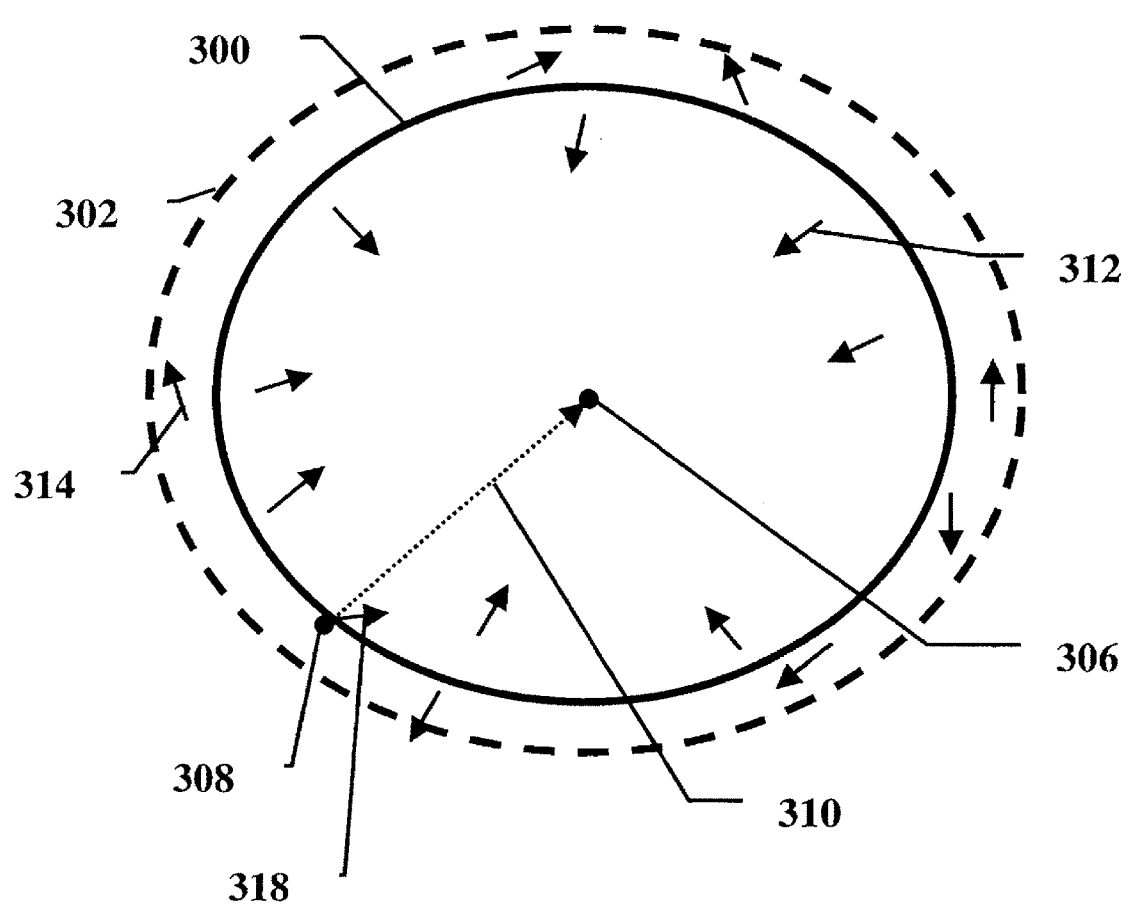
FIG. 3 is an illustration of the gradient direction convergence energy.

In present invention, intensity gradient direction convergence is used in the form of an energy in the fine level set evolution step 120 in FIG. 1. This energy requires that the intensity gradient be calculated for the image. The Sobel operator was used for this purpose. The convention used is that the gradient direction points in the direction of increasing image intensity. The gradient direction convergence (GDC) energy is described with reference to FIG. 3. The contour 300 of the current segmented region R in the radiograph is shown in FIG. 3. This contour will partially or wholly include the nodule. Until the segmentation process is complete this contour will also include regions of the radiographic image that are outside of the nodule. The surrounding region is the area of the image between contour 300 and contour 302. An aim point 306 is identified in region R. In one embodiment of this invention this aim point is the center of the region. In another embodiment aim point 306 is the point in the region with maximum intensity.

Since the gradient direction convergence energy is used after the coarse segmentation stage, the aim point is expected to be near the center of the nodule. Consequently, at all locations in the nodule the gradient tends to point to the aim point. For example, 312 is a gradient vector within the region that points towards aim point 306. One the other hand, at image locations outside of the nodule the gradient will not usually point to the aim point. For example, in FIG. 3, 314 is a gradient that does not point to the aim point 306.

The form of the intensity gradient direction convergence energy can be understood by considering the point 308 in FIG. 3 that is near the region contour 300. The gradient direction convergence energy depends on the angle between the gradient at this point 318 and a line 310 that connects the point to the aim point 306. The intensity gradient direction convergence energy has the integrand, $$f(x,y) = -\cos(\theta_{gr}(x,y) - \theta_o(x,y))H(\phi(x,y)) \quad (7)$$

where $\theta_{gr}(x, y)$ is the direction of the image intensity gradient at pixel $(x, y)$, $\theta_o(x, y)$ is the direction from the pixel $(x, y)$ to the aim point $(x_o, y_o)$. Inserting Equation (7) into Equation (2) results in the evolution equation for the gradient direction convergence energy, $$\frac{\partial \phi(x, y)}{\partial t} = \cos(\theta_{gr}(x, y) - \theta_o(x, y))\delta(\phi(x, y)). \quad (8)$$

Inspection of Equation (8) shows that at a pixel $(x, y)$ the value of the level set function is increased if the gradient points within plus of minus 90 degrees to the aim point. Otherwise the level set function is decreased. This has the affect of moving the segmented region contour to include pixels at which the gradient points to the aim point and excluding pixels at which the gradient points away from the aim point.

Curvature Energy

The purpose of the curvature energy is to penalize regions with a complicated contour. The energy integrand used is $$f(x,y) = |\nabla H(\phi(x,y))|. \quad (9)$$

Inserting Equation (9) into Equation (2) results in the evolution equation for the curvature energy, $$\frac{\partial \phi(x, y)}{\partial t} = \delta(\phi)div\left(\frac{\nabla \phi}{|\nabla \phi|}\right). \quad (10)$$

Prior Energy

The prior energy term that is used in a preferred embodiment of this invention is the symmetric formulation of Cremers and Soatto. [D. Cremers and S. Soatto, "A Pseudo-distance for Shape Priors in Level Set Segmentation," *2nd IEEE Workshop on Variational, Geometric, and Level Set Methods in Computer Vision*, Nice (2003).] The integrand for this energy is, $$f(x, y) = \{\phi(x, y) - \phi_o(x_p, y_p)\}^2 \frac{h(\phi(x, y)) + h(\phi_o(x_p, y_p))}{2} \quad (11)$$

where $\phi_0$ is the level set function of the prior and $h(\phi)$ is the normalized Heaviside function which is defined by, $$h(\phi) = \frac{H(\phi)}{\int_\Omega \int H(\phi)dxdy}. \quad (12)$$

The nodule in the radiograph is expected to have a size and shape similar to its appearance in the DRR that is calculated from the CT scan in step 104 in FIG. 1. However, its orientation and location remains to be determined. For this reason, segmentation using a prior shape is essentially a joint segmentation and registration process. In Equation (11) the level set function of the prior depends on coordinate $(x_p, y_p)$ in the domain of the prior image $\Omega_p$ which is related to coordinate $(x, y)$ in the radiograph by a rotation and translation which has the general form, $$\begin{bmatrix} x_p \\ y_p \end{bmatrix} = \vec{g}(x, y, \theta, t_x, t_y). \quad (13)$$

The evolution equation for the energy integrand in Equation (11) is given by, $$\frac{\partial \phi(x, y)}{\partial t} = -(\phi - \phi_o)\{h(\phi) + h(\phi_o)\} - \frac{\delta(\phi)}{2\int_\Omega \int H(\phi)dxdy}\left[(\phi - \phi_o)^2 - \int_\Omega \int (\phi - \phi_o)^2 h(\phi)dxdy\right]. \quad (14)$$

The parameters $\theta$, $t_x$, and $t_y$ of the transform in Equation (13) also have associated evolution equations which are obtained by taking the derivative of the prior energy with respect to the parameter and using the gradient decent method to minimize the energy. The evolution equation for $\theta$ is, $$\frac{\partial \theta}{\partial t} = \int_\Omega \int (\phi - \phi_o)\{h(\phi) + h(\phi_o)\}K_\theta dxdy - \frac{1}{2\int_\Omega \int H(\phi_o)dxdy}\int_\Omega \int \{(\phi - \phi_o)^2 - \overline{(\phi - \phi_o)^2}\}\delta(\phi_o)K_\theta dxdy \quad (15)$$

where, $$\overline{(\phi - \phi_o)^2} = \int_\Omega \int (\phi - \phi_o)^2 h(\phi_o)dxdy \quad (16)$$

and, $$K_\theta = \frac{\partial \phi_o}{\partial x}\frac{\partial g_x}{\partial \theta} + \frac{\partial \phi_o}{\partial y}\frac{\partial g_y}{\partial \theta} \quad (17)$$

where $g_x$ and $g_y$ are the x- and y-component of the vector $\bar{g}$, respectively. The evolution equation for $t_x$, and $t_y$ are identical to Equations (15) to (17) with $t_x$ and $t_y$ substituted for $\theta$.

Level-Set Segmentation Implementation—Image Intensity Code Value Normalization

In order to make the segmentation procedure robust with respect to the code value range of the input radiographic images, image intensity values that appear in the level set evolution equations are always normalized by dividing by the maximum allowed code value. The 12-bit code values of the radiographic images that were used to demonstrate this invention were divided by 4095.

Heaviside And Delta Functions

In level set implementations a regularized Heaviside function is often used that has a finite transition between 0 and 1. The regularized Heaviside function that is given by, $$H(z)\frac{1}{2}\left[1 + \frac{2}{\pi}\tan^{-1}\left(\frac{z}{\varepsilon}\right)\right] \quad (18)$$

where $\epsilon$ is a positive constant

For energies integrands that include pixels that are outside of the segmented region R the factor $(1-H(\phi))$ is used to select outside pixels. In practice it is necessary to limit this outside region to points that immediately surround the segmented region. Otherwise, statistical quantities such as the minimum intensity outside the region in Equation (5) will depend on points that are far away from the region. Furthermore, the results of the segmentation method will depend on field-of-view of the processed radiograph. Therefore, the outside region is limited to points for which $$\phi_{min} \leq \phi < 0 \quad (19)$$

where $\phi_{min}$ is a negative constant.

A delta function with finite support must be used in level set segmentation because the level set function mainly evolves in a boundary region where this function is non-zero. The regularized delta function, $$\delta(\phi) \equiv \frac{\varepsilon}{\pi} \frac{1}{\varepsilon^2 + \phi^2} \quad (20)$$

is obtained by taking the derivative of H(z) as defined in Equation (18). The extent of the boundary region is determined by both the value of $\varepsilon$ and the gradient of the level set function $\phi(x, y)$ around points where $\phi(x, y)=0$.

Level Set Function Initialization

The initial region in the radiographic region is initialized to a circle. In this case, the level set function is initialized to a signed distance function using the equation, $$\phi(x,y) = r^2 - \sqrt{(x-x^c)^2+(y-y^c)^2} \quad (21)$$

where r is the radius of the initial region and $(x^c, y^c)$ is the center of the region.

The level set function for the nodule region in the prior DRR image is initialized to a signed distance function by solving the differential equation, $$\frac{\partial \phi(x, y, t)}{\partial t} = S(I_{mask}(x, y))(1 - |\nabla \phi(x, y, t)|) \quad (22)$$

where $I_{mask}$ is the mask of the nodule region in the DRR and, $$S = \begin{cases} -1 & \text{Outside Mask} \\ 0 & \text{Mask Boundary} \\ +1 & \text{Inside Mask} \end{cases} \quad (23)$$

The method of solving the differential equation is described by M. Sussman, P. Smereka, and S. J. Osher, in "A Level Set Method for Computing Solutions to Incompressible Two-Phase Flow," *J. Comp. Phy.* 114, pp. 146-159 (1994).

Mapping Between Radiograph and DRR

The mapping in Equation (13) from the image domain of the radiograph $\Omega$ to the image domain of the prior DRR $\Omega_{Pr}$ is chosen to uncouple the evolution equations for the mapping transform parameters $\theta$, $t_x$, and $t_y$. The mapping is, $$\begin{bmatrix} x_p \\ y_p \end{bmatrix} = \begin{bmatrix} x_p^c + (x - x_p^c - t_x)\cos\theta + (y - y_p^c - t_y)\sin\theta \\ y_p^c - (x - x_p^c - t_x)\sin\theta + (y - y_p^c - t_y)\cos\theta \end{bmatrix} \quad (24)$$

where $(x_p^c, y_p^c)$ is the center of the nodule region in the DRR. The inverse transformation of Equation (24) that maps a point in the DRR image to the radiographic image is a rotation around the center of the prior shape plus a translation.

Evolution of Level Set Function

In each iteration in the coarse evolution, step 116 in FIG. 1, and fine evolution, step 120, of the level set function $\phi(x, y)$ the change in the function is calculated using a weighted sum of the time derivatives of $\phi(x, y)$ for each of the energies that are described above, $$d\phi(x, y) = \left[\lambda_{MS}\left(\frac{\partial \phi}{\partial t}\right)_{MS} + \lambda_{contrast}\left(\frac{\partial \phi}{\partial t}\right)_{contrast} + \lambda_{curv}\left(\frac{\partial \phi}{\partial t}\right)_{curv} + \lambda_{GDC}\left(\frac{\partial \phi}{\partial t}\right)_{GDC} + \lambda_{prior}\left(\frac{\partial \phi}{\partial t}\right)_{prior}\right]dt. \quad (25)$$

The transform parameters in Equation (24) are initialized to zero and the level set function is initialized as described above. An output of the level set evolution steps 116 and 120 is a mask of the segmented region. This mask is easily generated from the level set function.

Post-Processing of Region Mask

In step 122 in FIG. 1 the mask from the fine evolution step 120 is processed further. The result of level set segmentation is often disconnected regions. In this step, the region center is found and the connected region that contains this center is retained and all other regions are removed. In addition, small openings in this mask are eliminated using a morphological closing operation.

Demonstration of Nodule Segmentation Improvement

The table below shows standard parameter values that are used in the coarse and fine level set evolution steps 116 and 120. As described below, these values are modified for the purpose of demonstrating the improvements due to this invention.

| Standard Parameter Values | | |
| --- | --- | --- |
| Parameter | Coarse | Fine |
| Pixel Spacing (mm) | 0.336 | 0.168 |
| Iterations | 100 | 20 |
| dt | 1.0 | 1.0 |
| $\varepsilon$ | 1.59 | 3.17 |
| $\phi_{min}$ | −15.9 | −31.7 |
| $\lambda_{contrast}$ | 500 | 0 |
| $\lambda_{MS}$ | 0 | 0 |
| $\lambda_{GDC}$ | 0 | 50 |
| $\lambda_{curve}$ | 50 | 50 |
| $\lambda_{prior}$ | 100 | 100 |

Figure 4:
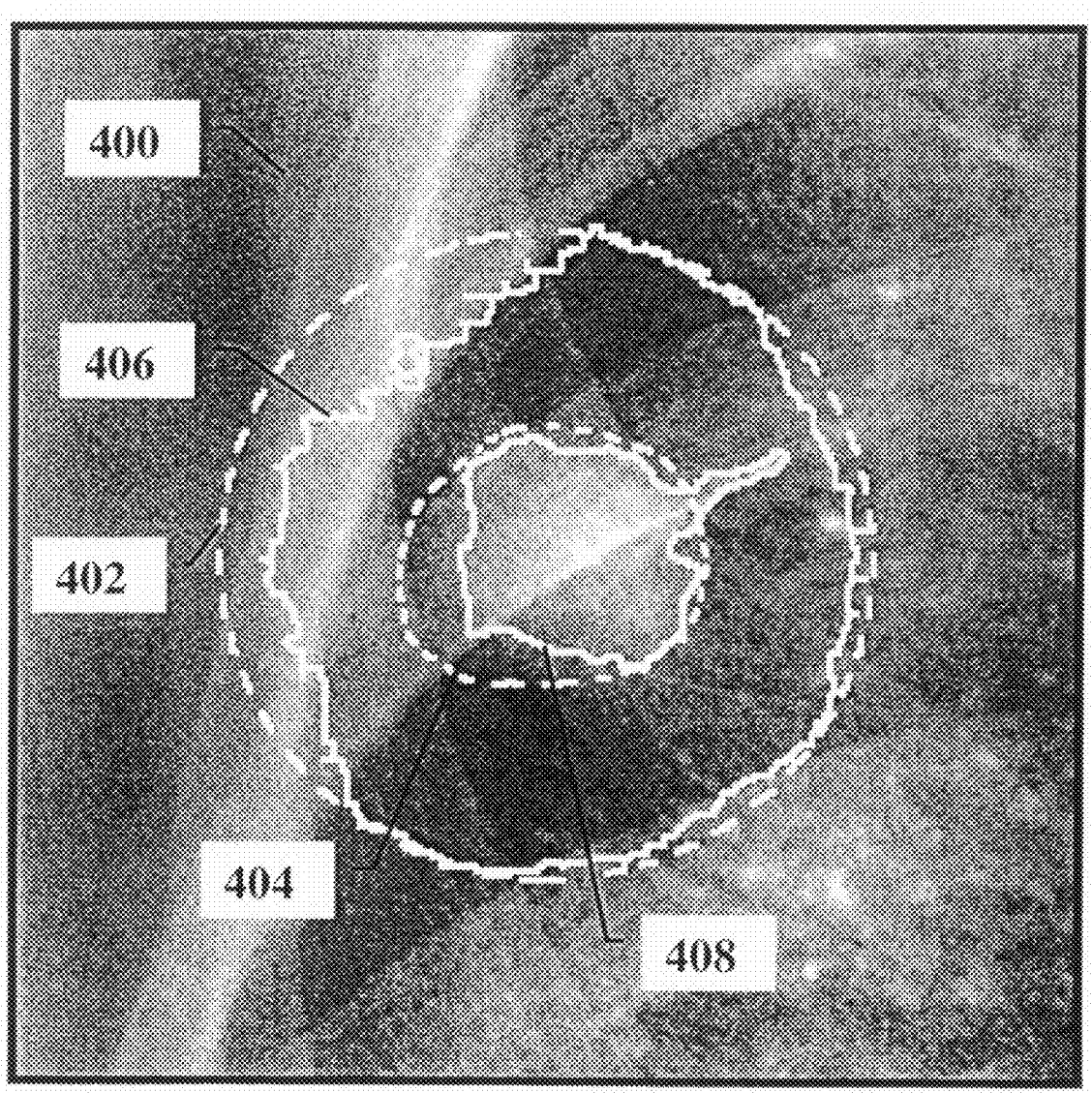
FIG. 4 illustrates the advantage of using contrast energy for nodule segmentation as compared with the Mumford-Shah energy.

The advantage of using the contrast energy of this invention for the segmentation of a nodule in a radiographic image is illustrated in FIG. 4. The radiographic image 400 contains at its center a pulmonary nodule. The contour 404 shows the true boundary of the nodule. The goal of a nodule segmentation method is to automatically calculate a contour that matches the true contour. The initial contour 402 is a circle that encloses a region in the radiograph in which the nodule is expected to be located. Contour 406 in FIG. 4 shows the contour that is calculated by steps 110 through 122 in FIG. 1 with 100 iterations in the coarse evolution step 116 and zero iterations in the fine evolution step 120. In the coarse evolution step the Mumford-Shah energy was used in place of the contrast energy ($\lambda_{MS}$=500, $\lambda_{contrast}$=0). Contour 408 in FIG. 4 shows the contour that was calculated under identical conditions when the contrast energy of this invention is used instead of the Mumford-Shah energy ($\lambda_{MS}=0$, $\lambda_{contrast}=500$). Due to the non-uniformity in image intensity both inside and surrounding the nodule contour 406 that is calculated with the Mumford-Shah energy does not converge to the true contour. However, contour 408 that is calculate using the contrast energy of this invention closely matches the true contour.

Figure 5:
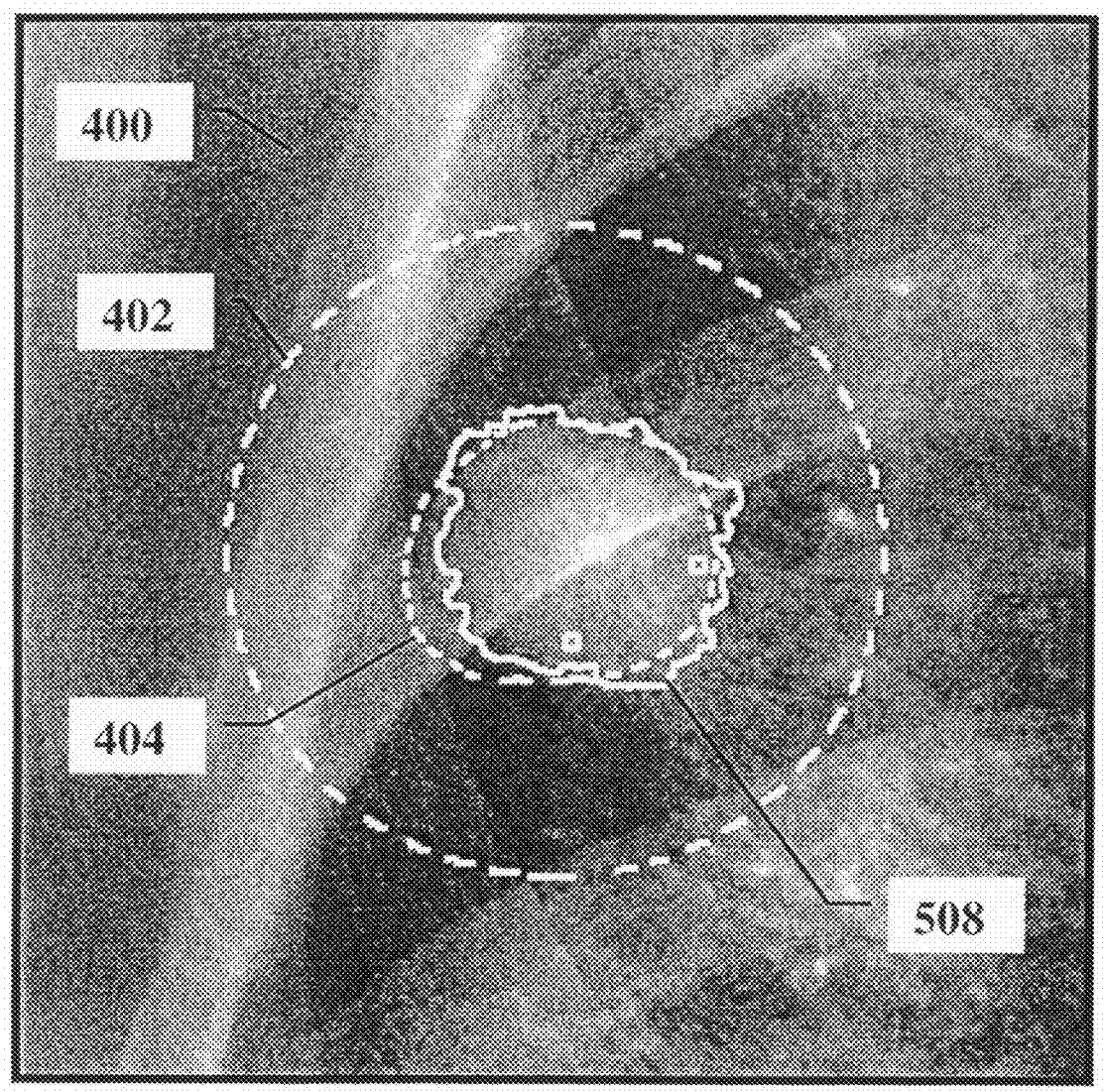
FIG. 5 illustrates nodule segmentation improvement using the direction convergence energy.

The improvement in nodule segmentation that results from using the gradient direction convergence energy of this invention is illustrated in FIG. 5. FIG. 5 shows the radiographic image 400 that also appears in FIG. 4 along with the initial contour 402 and the true nodule contour 404. The contour 508 in FIG. 5 shows the results of the segmentation method when 20 iterations using the gradient direction convergence energy are added in the fine level set evolution step 120 to 100 iteration in the coarse evolution step 116. The contour 508 in FIG. 5 is clearly a further improvement on the contour 408 in FIG. 4.

A quantitative metric of the quality of a segmentation method is provided by the equation, $$Q = 0.5\left(2 - \frac{A_{region}^{out}}{A_{region}} - \frac{A_{ref} - A_{region}^{in}}{A_{ref}}\right) \quad (26)$$

where $A_{region}$ is the area of the segmented region, $A_{ref}$ is the area of the true region, $A_{region}^{out}$ is the area of the segmented region that outside the true region, and $A_{region}^{in}$ is the area of the segmented region that is inside the true region. This metric ranges from zero in the case that the segmented region has no overlap with the true region and one when the segmented region and true region are exactly the same.

Using Equation (26) the quality of the segmented region is only 0.62 when the Mumford-Shah energy is used in the coarse level set evolution step to segment the nodule. The quality of segmentation increases to 0.81 when the Mumford-Shah energy is replaced by the contrast energy of this invention. The quality of segmentation increases further to 0.87 when the gradient direction convergence energy of this invention is used in the fine level set evolution step.

In the present invention the word intensity is used to refer to the pixel code values of a digital radiographic image. It should be understood that intensity is a general term that refers to the code values of an image for any image representation. For example, the intensity may be a linear or nonlinear function of the exposure that created the image. In the case of a radiographic image, the image intensity is normally an increasing function of the radiodensity of the object. For instance, tissue with high radiodensity such as a bone will appear bright and tissue with low radiodensity such as air filled lung will appear dark.

The present invention is described assuming this standard representation of a radiographic image. It should be understood that the method of this invention can be used to locate nodules in radiographic images with opposite polarity (dark bone, white lung). For the case of opposite polarity radiographic images, the invention description needs to be modified by replacing references to high and maximum intensity with low and minimum intensity and visa versa. Also, the convention that the image intensity gradient direction points from low to high intensity needs to be changed to points from high to low intensity. Furthermore, an object in a radiographic image is often segmented after a preprocessing step such as step 112 in FIG. 1. After a preprocessing step the intensity of the radiographic image may no longer be simply related to the expose with which the image was created. For example in a preferred embodiment of this invention, after the processing step 112, the image intensity is the difference in the intensity of intermediate images.

The present invention is described in the context of level set segmentation. However, the level set is just a convenient means of representing a contour in an image. This invention can also be used with other types of segmentation methods and region representations. For example, the contour of the segmented region can be represented as a parameterized curve or as splines between control points.

In the description of this invention the planning image is a CT scan from which a DRR is calculated. The projection of the nodule in this DRR is used as a prior in the segmentation process. This invention also includes using other imaging modalities including magnetic resonance imaging (MRI) as the planning image.

The present invention is described in the context of localizing a nodule which is the target for radiotherapy. However, this invention can also be used for other purposes including localizing an object in a radiographic image during surgery.

A preferred embodiment of this invention is implemented as a software program. Those skilled in the art will readily recognize that the equivalent of such software may also be constructed in hardware. Still further, as used herein, the computer program may be stored in a computer readable storage medium, which may comprise, for example; magnetic storage media such as a magnetic disk or magnetic tape, optical storage media such as an optical disc, optical tape, solid state electronic storage devices such as random access memory (RAM), read only memory (ROM), or any other physical device or medium employed to store a computer program.

PARTS LIST 100 capture CT scan of nodule in patient step
102 delineate nodule boundary in CT step
104 calculate DRR step
106 initialization of prior level set function step
107 prior level set function
110 capture radiograph of nodule step
112 preprocess radiograph step
114 initial level set function of region in radiograph step
116 coarse evolution of level set function step
118 reinitialization of level set function step
120 fine evolution of level set function step
122 post processing of region mask step
124 nodule location in radiograph
200 contour of segmented region
202 contour of region surround
204 pixel in region with highest intensity
206 pixel in surround with lowest intensity
208 pixel near region contour
300 boundary of segmented region
302 contour of region surround
306 aim point in region
308 pixel near region contour
310 line that points from pixel near region contour to aim point
312 intensity gradient direction at pixel in region that points to aim point
314 intensity gradient direction at pixel outside region that points away from aim point
318 intensity gradient direction at pixel near region boundary
400 radiographic image that contains a pulmonary nodule 402 initial region contour
404 true contour of nodule
406 region contour after segmentation with Mumford-Shah energy
408 region contour after segmentation with contrast energy
508 region contour after segmentation with gradient direction convergence energy

The invention claimed is:

1. A method of determining a location of an object in a radiographic image by segmentation of a region in the image comprising the steps of:
    determining, from memory storing the image, a first image intensity in said region, wherein said first image intensity is a maximum intensity of said region;
    determining a second image intensity outside of said region, wherein said second image intensity is a minimum intensity outside of said region;
    determining if a pixel is added to or removed from said region based on a similarity of an intensity of said pixel to said first and second intensities; and
    using contrast energy, modifying a contour of said region to selectively include the pixel within the region based on the determining if a pixel is added to or removed from said region.

2. The method of claim 1 wherein said object is a nodule.

3. The method of claim 2 object is a pulmonary nodule.

4. The method of claim 2 wherein an application of therapeutic radiation to said nodule is modified based on a characteristic of said region.

5. A method of determining a location of an object in a radiographic image by segmentation of a region in the image comprising the steps of:
    determining, from memory storing the image, an aim point in said region, wherein said aim point is located at a point in said region with maximum intensity;
    identifying an image pixel outside of said region;
    determining a direction from said image pixel to said aim point;
    determining an image intensity gradient direction at said image pixel;
    determining if said image pixel is added to or removed from said region based on a comparison of said direction from said image pixel to said aim point and said image intensity gradient direction; and
    using contrast energy, modifying a contour of said region to selectively include the pixel within the region based on the determining if a pixel is added to or removed from said region.

6. The method of claim 5 wherein said object is a nodule.

7. The method of claim 6 wherein said object is a pulmonary nodule.

8. The method of claim 6 wherein an application of therapeutic radiation to said nodule is modified based on a characteristic of said region.

9. The method of claim 5 wherein said point in said region with maximum intensity is a center of the region.

* * * * *

UNITED STATES PATENT AND TRADEMARK OFFICE
CERTIFICATE OF CORRECTION

PATENT NO.         : 7,876,937 B2
APPLICATION NO.    : 11/532246
DATED              : January 25, 2011
INVENTOR(S)        : Jay S. Schildkraut and Shoupu Chen Page 1 of 1

It is certified that error appears in the above-identified patent and that said Letters Patent is hereby corrected as shown below:

Column 13, line 8   Please replace the words "The invention claimed is:" with the word --CLAIMS:--

Signed and Sealed this
Nineteenth Day of February, 2013

Teresa Stanek Rea
*Acting Director of the United States Patent and Trademark Office*